(12) United States Patent
Matsuo et al.

(10) Patent No.: US 10,186,693 B2
(45) Date of Patent: Jan. 22, 2019

(54) FLAT SECONDARY BATTERY

(71) Applicant: Nissan Motor Co., Ltd., Yokohama-Shi, Kanagawa (JP)

(72) Inventors: Azusa Matsuo, Kanagawa (JP); Yoshiaki Nitta, Kanagawa (JP); Takamitsu Saito, Kanagawa (JP); Ami Oume, Kanagawa (JP); Takehiro Maeda, Kyoto (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/302,399

(22) PCT Filed: Mar. 31, 2015

(86) PCT No.: PCT/JP2015/060126
§ 371 (c)(1),
(2) Date: Oct. 6, 2016

(87) PCT Pub. No.: WO2015/156168
PCT Pub. Date: Oct. 15, 2015

(65) Prior Publication Data
US 2017/0025649 A1    Jan. 26, 2017

(30) Foreign Application Priority Data
Apr. 11, 2014  (JP) .................................. 2014-082376

(51) Int. Cl.
*H01M 2/02* (2006.01)
*H01M 2/08* (2006.01)
(Continued)

(52) U.S. Cl.
CPC ............. *H01M 2/08* (2013.01); *H01M 2/024* (2013.01); *H01M 4/505* (2013.01); *H01M 4/525* (2013.01);
(Continued)

(58) Field of Classification Search
CPC .... H01M 2/02; H01M 10/0585; H01M 2/024; H01M 10/0413; H01M 4/505;
(Continued)

(56) References Cited

U.S. PATENT DOCUMENTS

2005/0271943 A1*  12/2005  Park ................... C01G 45/1242
                                                                      429/231.1
2007/0009794 A1    1/2007  Takami et al.
2008/0305394 A1*  12/2008  Hisamitsu ............... H01M 4/13
                                                                      429/209

FOREIGN PATENT DOCUMENTS

JP          2001297748 A      10/2001
JP          2006318752 A      11/2006
(Continued)

*Primary Examiner* — Carmen V Lyles-Irving
(74) *Attorney, Agent, or Firm* — Young Basile Hanlon & MacFarlane, P.C.

(57) ABSTRACT

A flat secondary battery has a laminate-type power generation element in which two or more plate-like electrodes are laminated via each of separators; and a pair of rectangular exterior members when viewed from a lamination direction of the two or more electrodes, the rectangular exterior members sealing the laminate-type power generation element and an electrolyte solution. At least one exterior member of the pair of the rectangular exterior members comprises: an abutting part including an abutting surface that abuts against an uppermost layer electrode of the two or more electrodes; a sealing part at which the rectangular exterior members overlap each other at an outer circumferential position of the rectangular exterior members; and an extending part that extends from the abutting part to the sealing part, and the flat secondary battery satisfies:

$$1.03 \le \frac{L}{\sqrt{b^2 + d^2}} \le 1.22$$

3 Claims, 16 Drawing Sheets

(51) Int. Cl.
*H01M 10/0585* (2010.01)
*H01M 10/04* (2006.01)
*H01M 4/505* (2010.01)
*H01M 4/525* (2010.01)
*H01M 4/587* (2010.01)
*H01M 4/62* (2006.01)
*H01M 10/0525* (2010.01)
*H01M 10/0569* (2010.01)

(52) U.S. Cl.
CPC ........... *H01M 4/587* (2013.01); *H01M 4/623* (2013.01); *H01M 10/0413* (2013.01); *H01M 10/0525* (2013.01); *H01M 10/0569* (2013.01); *H01M 10/0585* (2013.01); *H01M 2300/004* (2013.01)

(58) Field of Classification Search
CPC ...... H01M 4/525; H01M 4/587; H01M 4/623; H01M 10/0525; H01M 10/0569; H01M 2300/004
See application file for complete search history.

(56) References Cited

FOREIGN PATENT DOCUMENTS

| | | |
|---|---|---|
| JP | 2007018881 A | 1/2007 |
| JP | 2007317481 A | 12/2007 |
| JP | 2012033449 A | 2/2012 |
| JP | 2013048042 A | 3/2013 |

* cited by examiner

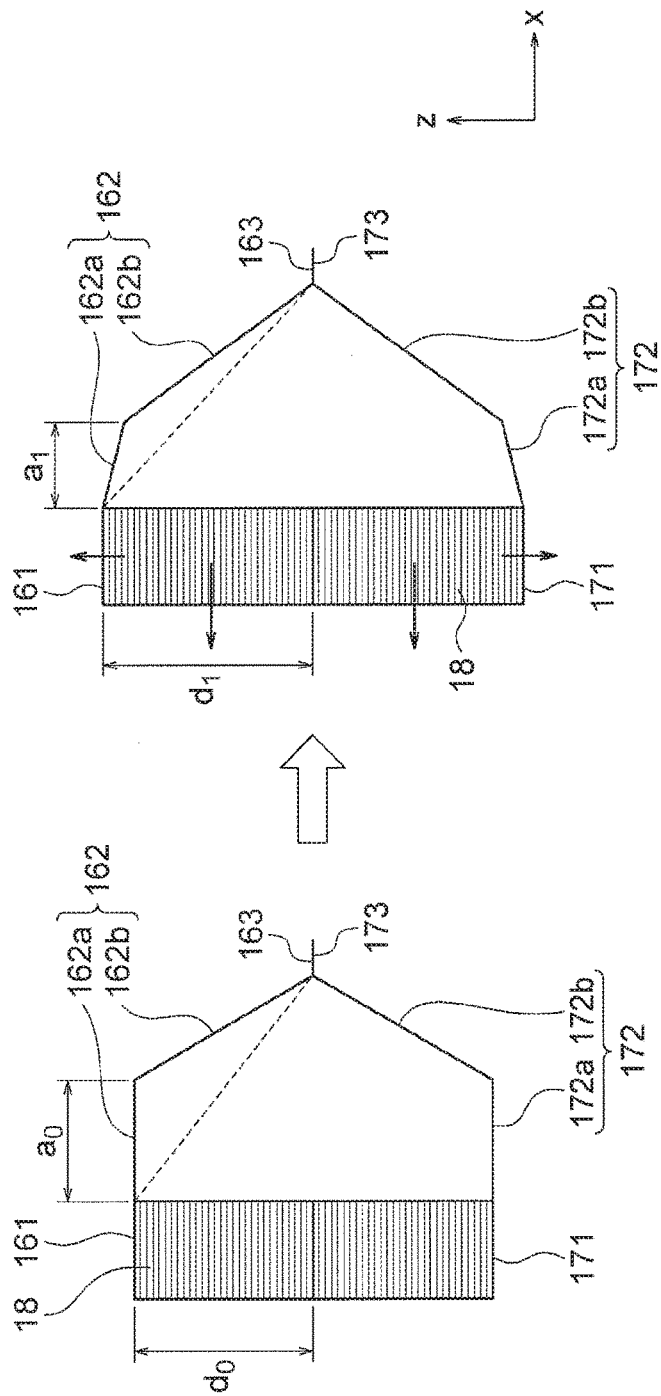

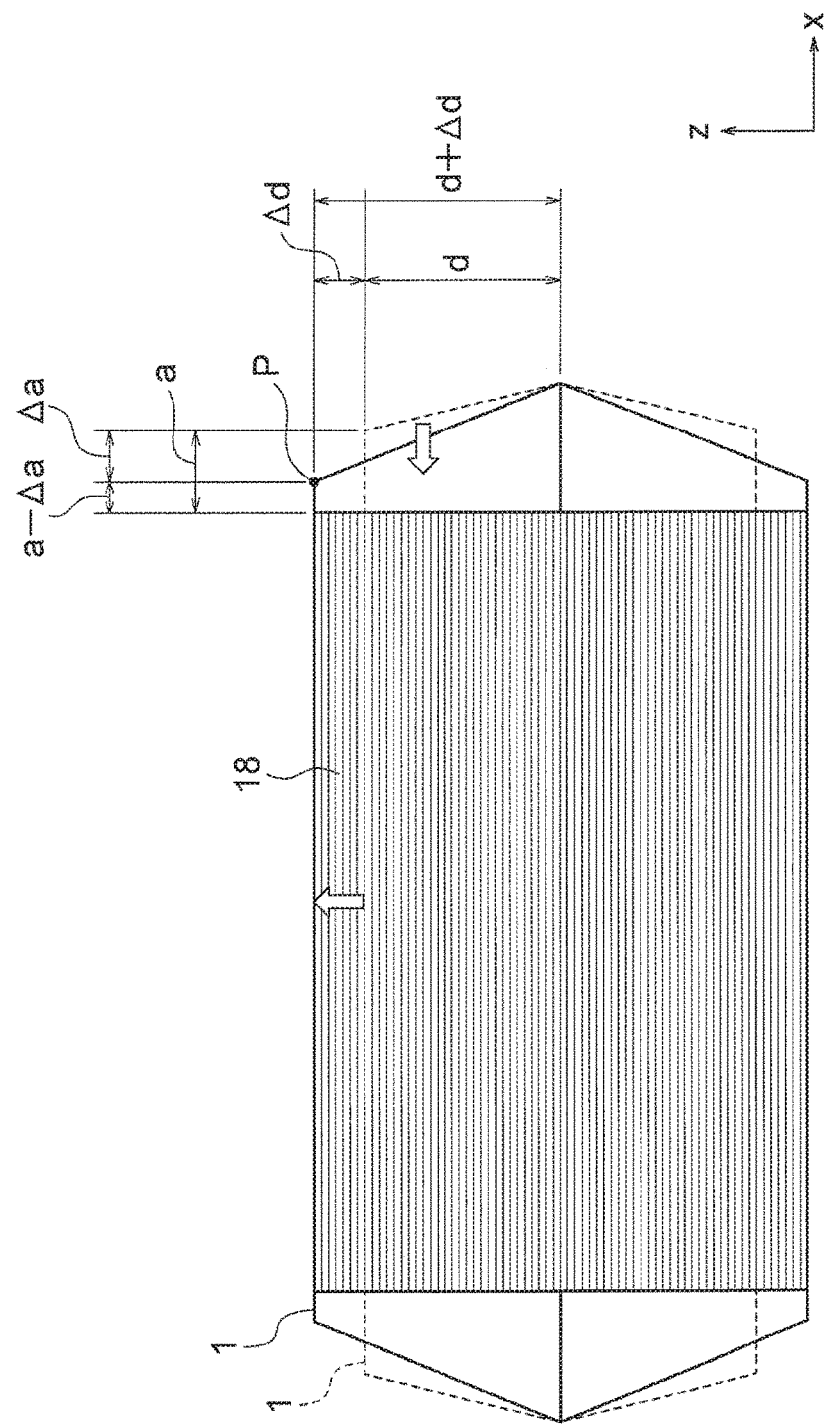

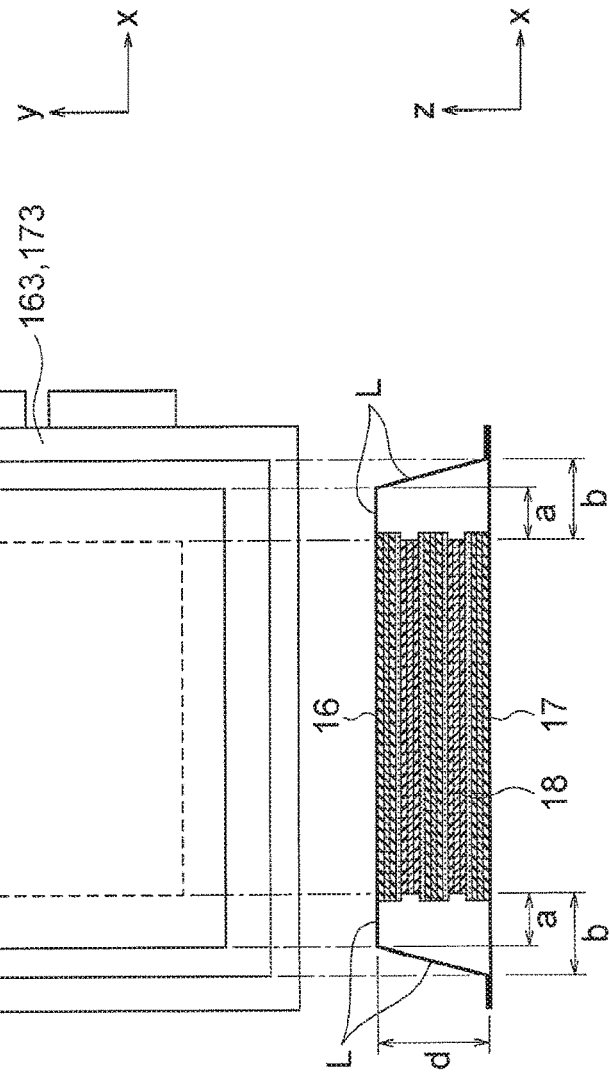

FLAT SECONDARY BATTERY

CROSS REFERENCE TO RELATED APPLICATION

This application claims priority to Japanese Patent Application No. 2014-082376, filed on Apr. 11, 2014, incorporated herein by reference.

TECHNICAL FIELD

The present invention relates to a flat secondary battery.

BACKGROUND

JP 2001-297748A discloses a nonaqueous electrolyte secondary battery comprising a flat battery element, a bag-like exterior case which houses the flat battery element, a positive electrode lead which is led out from a sealing part of the exterior case, and a negative electrode lead which is led out from the sealing part of the exterior case. The flat battery element is configured such that sheet-like or film-like positive electrode plates, separators for holding electrolyte, and negative electrode plates are laminated. One end of the positive electrode lead is connected to the positive electrode plates and one end of the negative electrode lead is connected to the negative electrode plates.

In the above secondary battery, however, the interior space of the battery formed between the power generation element and the case is not taken into account. Therefore, when the charge and discharge are repeated and accordingly the electrodes expand in the thickness direction to deform the case, the pressure applied from the laminate exterior case to the power generation element becomes ununiform to lead to ununiform cell reaction and poor durability of the cell.

SUMMARY

Problems to be solved by the present invention include providing a flat secondary battery in which the pressure applied from the laminate exterior case to the power generation element is suppressed from being ununiform and the durability of the cell can be improved when the charge and discharge are repeated and accordingly the electrodes expand in the thickness direction.

Means for Solving Problems

The present invention solves the above problem as follows. A flat secondary battery comprises: a laminate-type power generation element; and a pair of exterior members that are formed into a rectangular shape when viewed from a lamination direction of electrodes while sealing the laminate-type power generation element and an electrolyte solution. The exterior member comprises an abutting part including an abutting surface that abuts against an uppermost layer electrode, a sealing part at which the exterior members overlap each other at an outer circumferential position of the exterior members, and an extending part that extends from the abutting part to the sealing part. The relationship among the length (L), the length (b), and the thickness (d) satisfies Expression (1) below. The length (L) represents a length of the extending part, the length (b) represents a length from an electrode located at height of the sealing part in the lamination direction between the sealing parts to the sealing parts, and the thickness (d) represents a length of the laminate-type power generation element.

[Expression 1]

$$1.03 \leq \frac{L}{\sqrt{b^2 + d^2}} \leq 1.22 \quad (1)$$

Effect of Invention

According to the present invention, when the charge and discharge are repeated to expand the electrodes in the thickness direction, the stress applied to the sealing part of the laminate exterior case and the like can be relaxed. Therefore, even when the case deforms, the pressure applied to the power generation element can be uniform. This can result in suppression of deterioration progression in the battery.

DETAILED DESCRIPTION OF THE DRAWINGS

Figure 1:
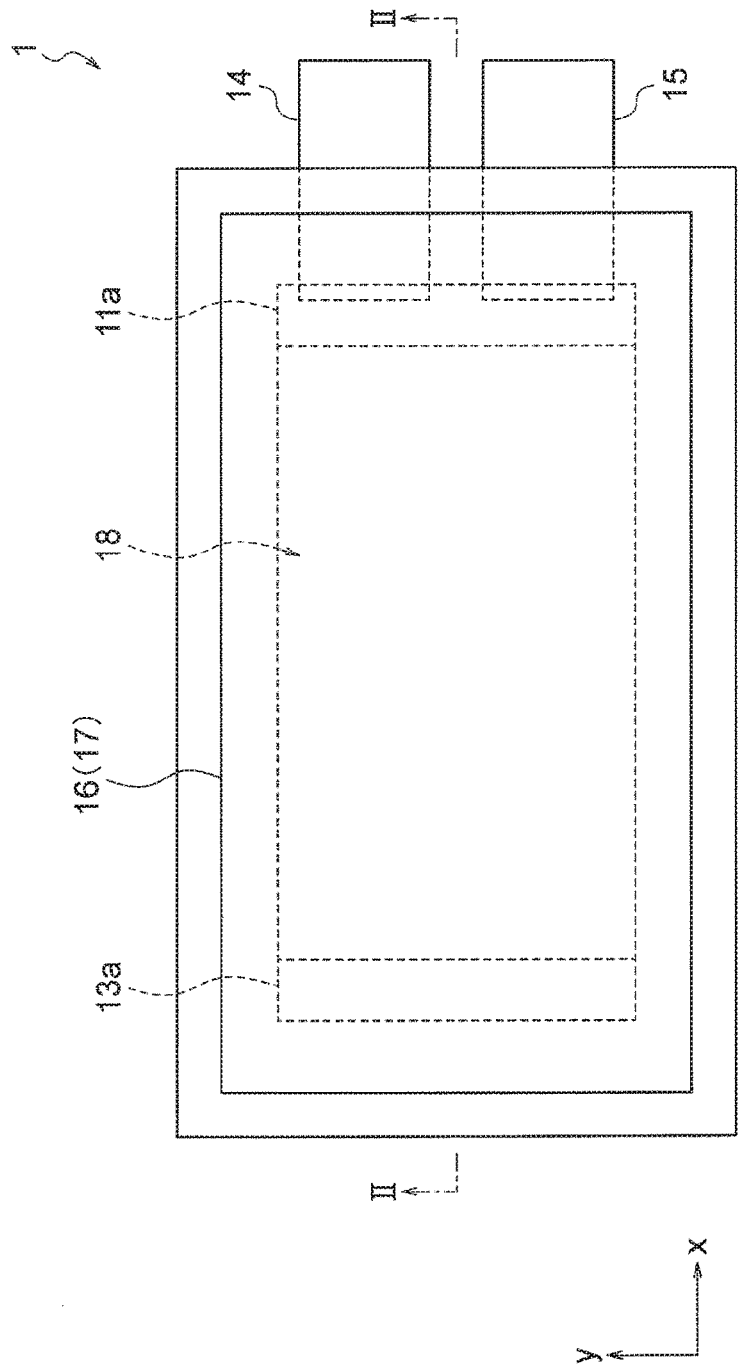
FIG. 1 is a plan view of a secondary battery according to one or more embodiments of the present invention.
Figures 4A, 4B:
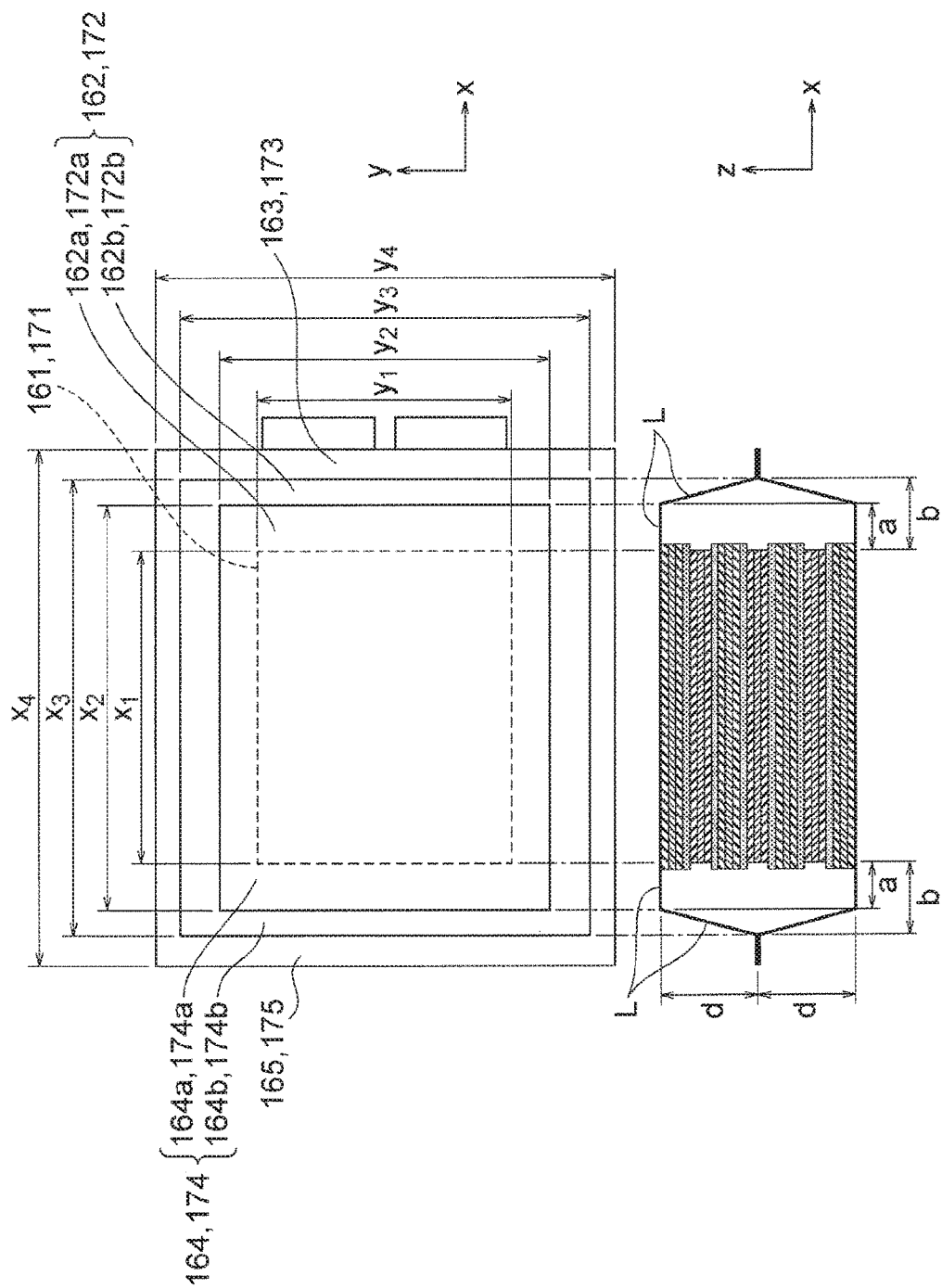
Figure 7:
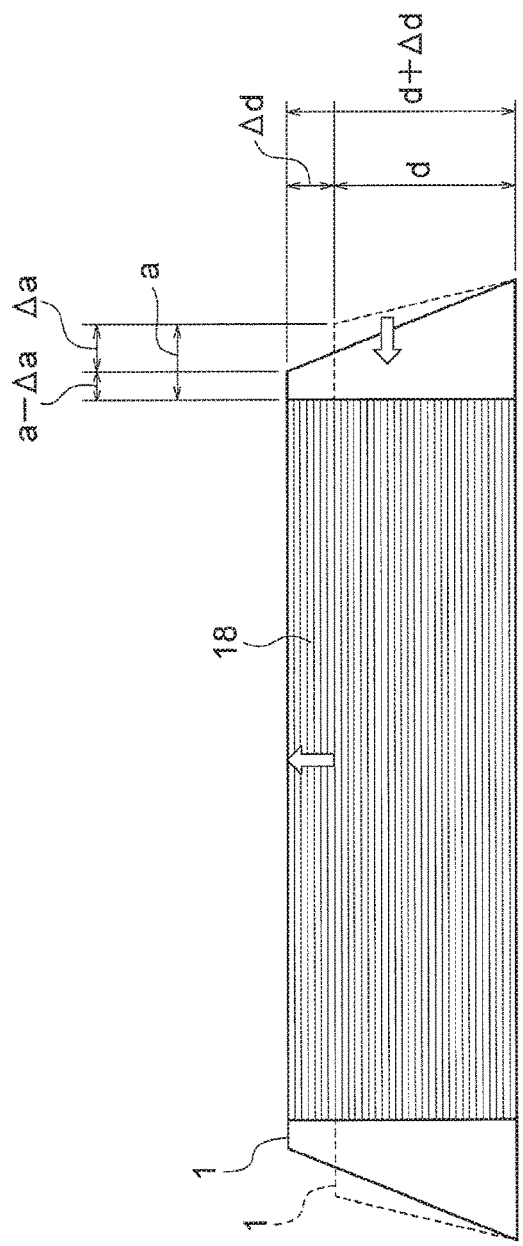
Figures 8A, 8B:
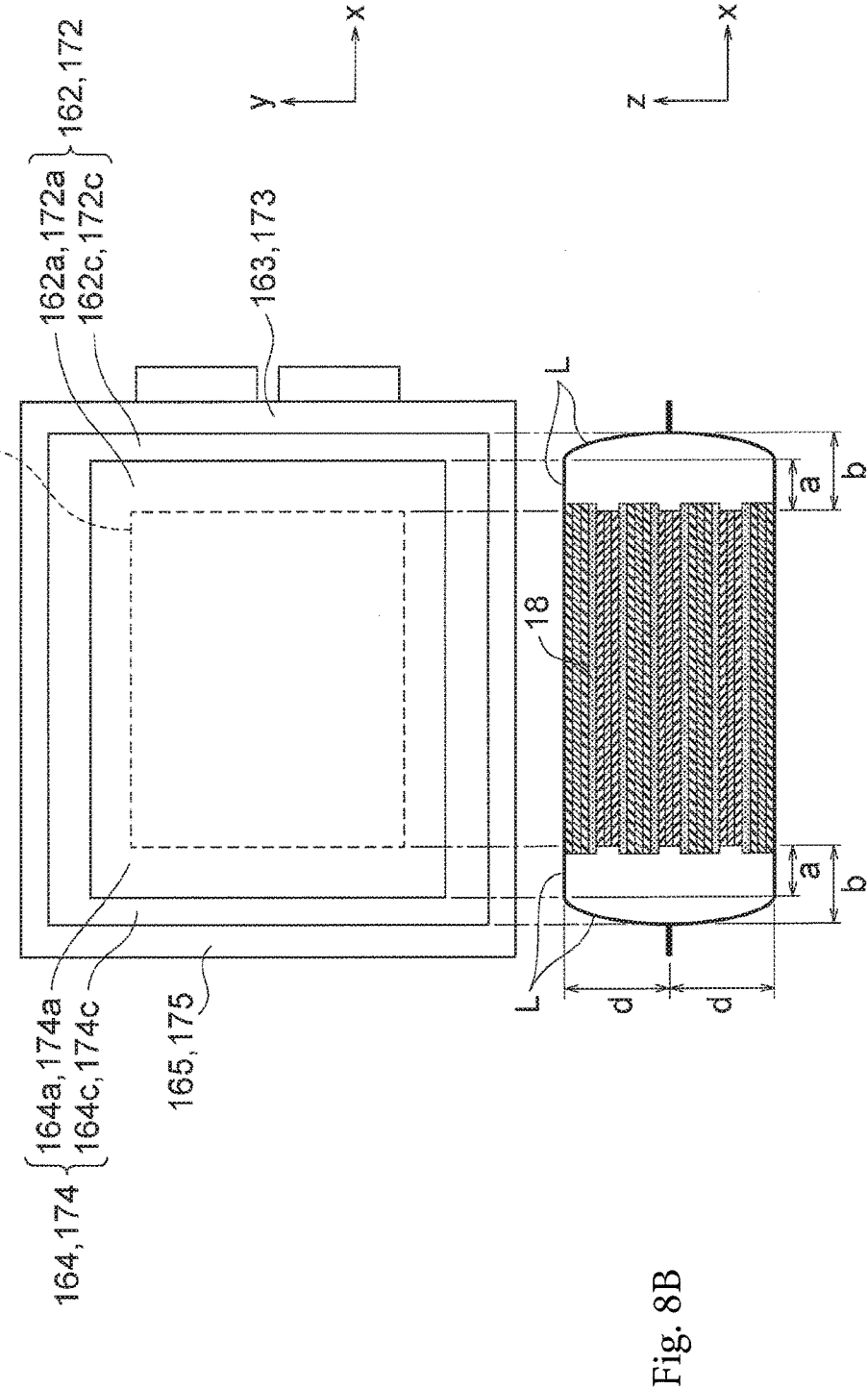
Figure 9:
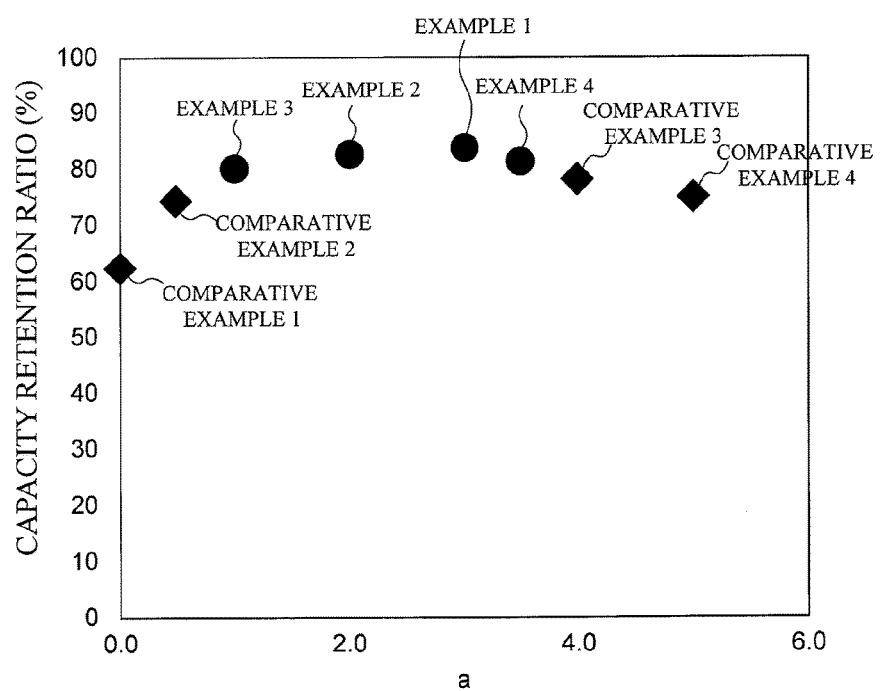
Figure 10:
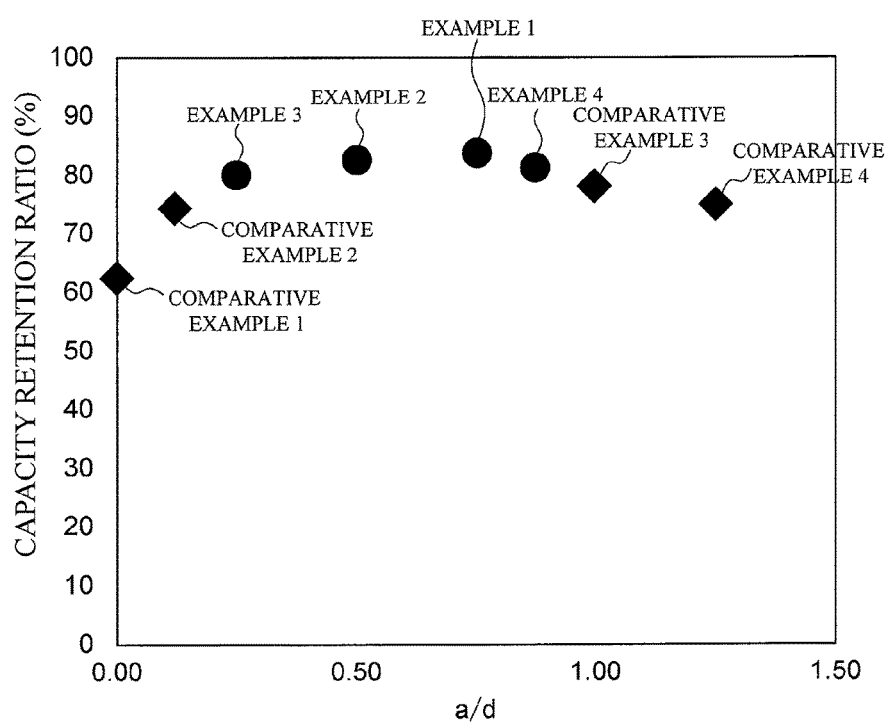
Figure 11:
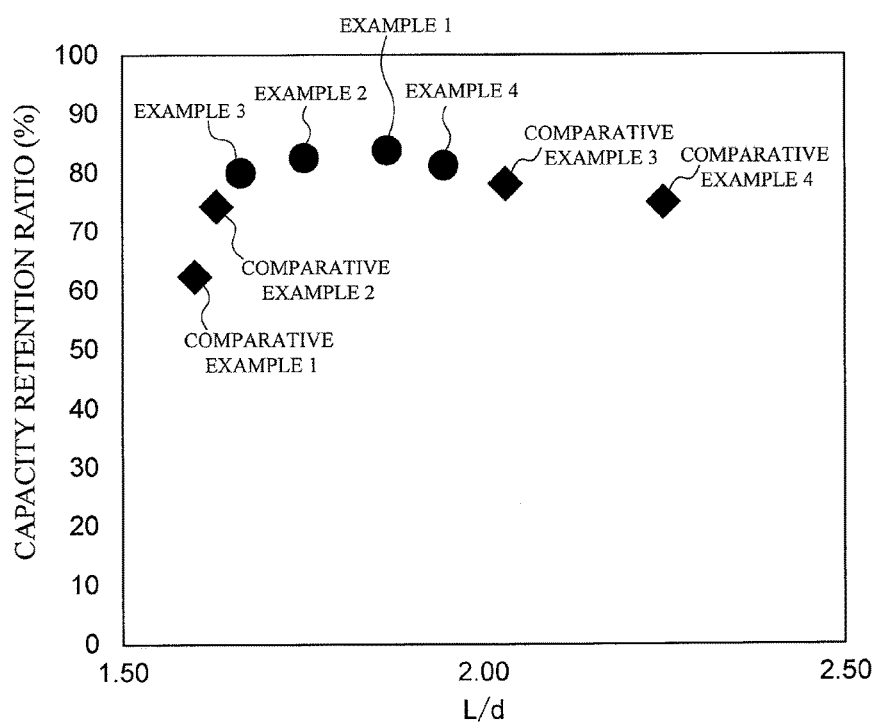
Figure 12:
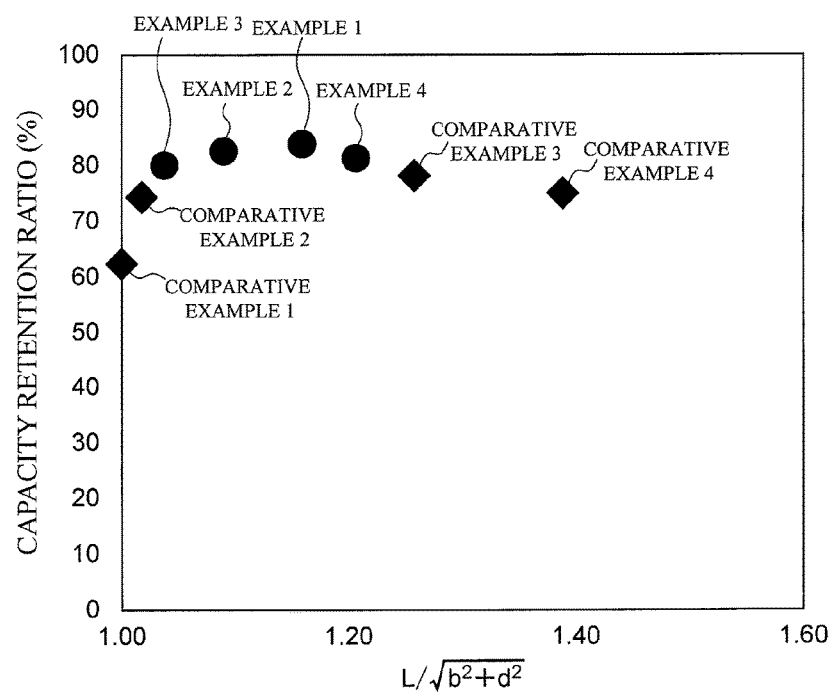
Figure 13:
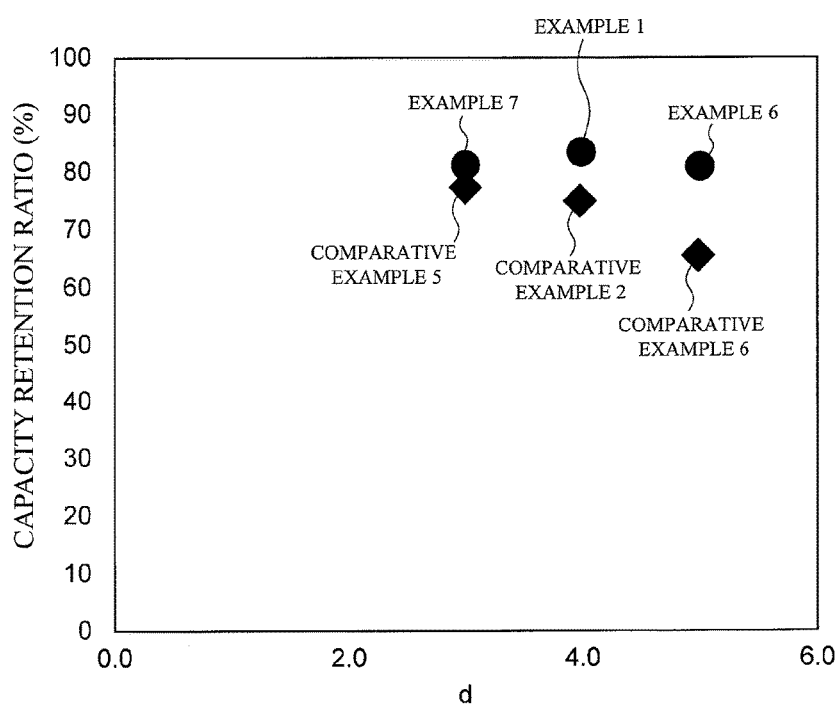
Figure 14:
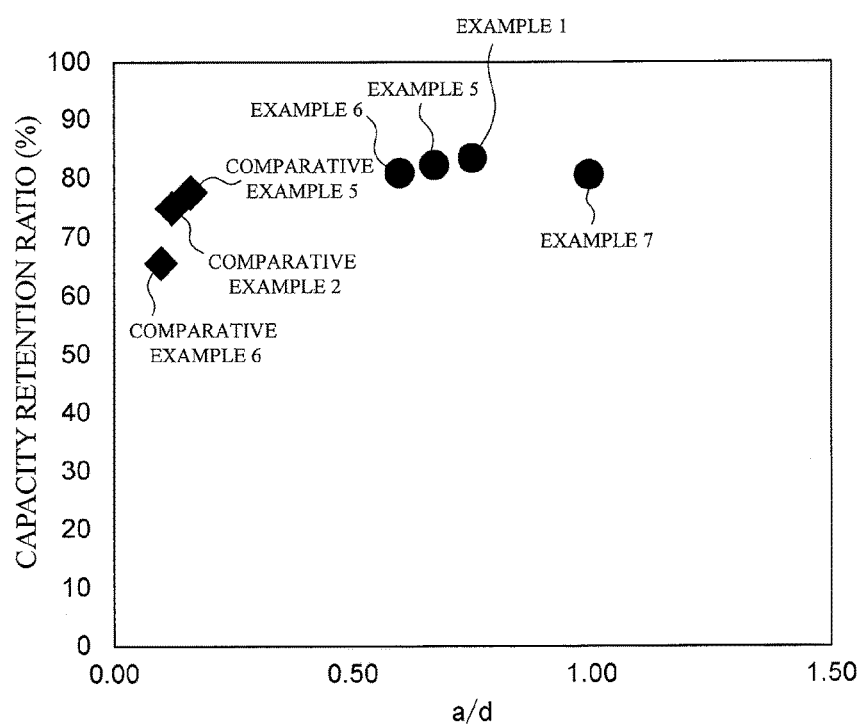
Figure 15:
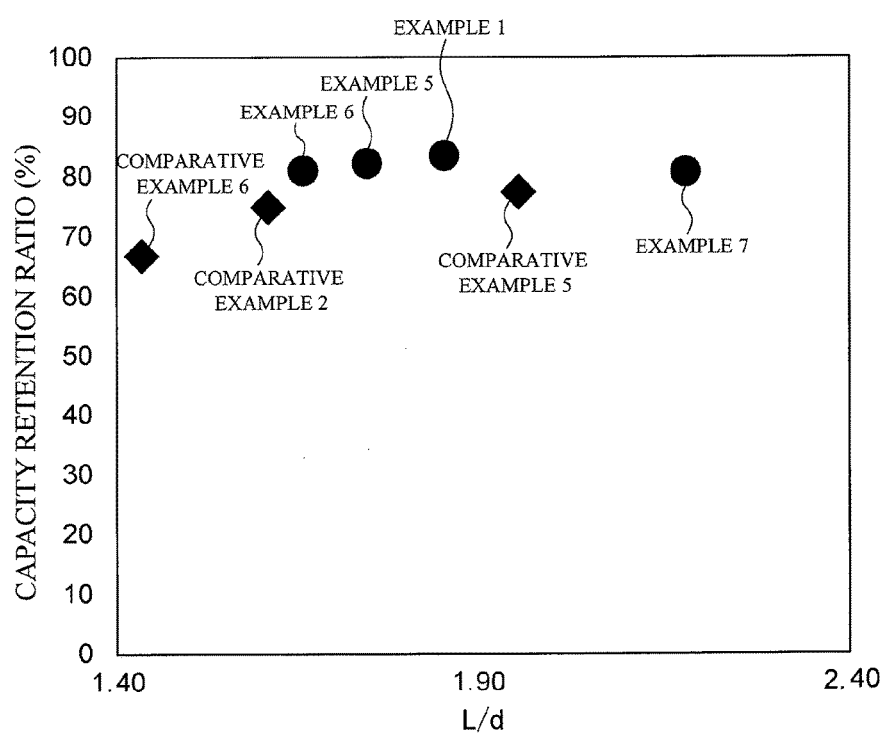
Figure 16:
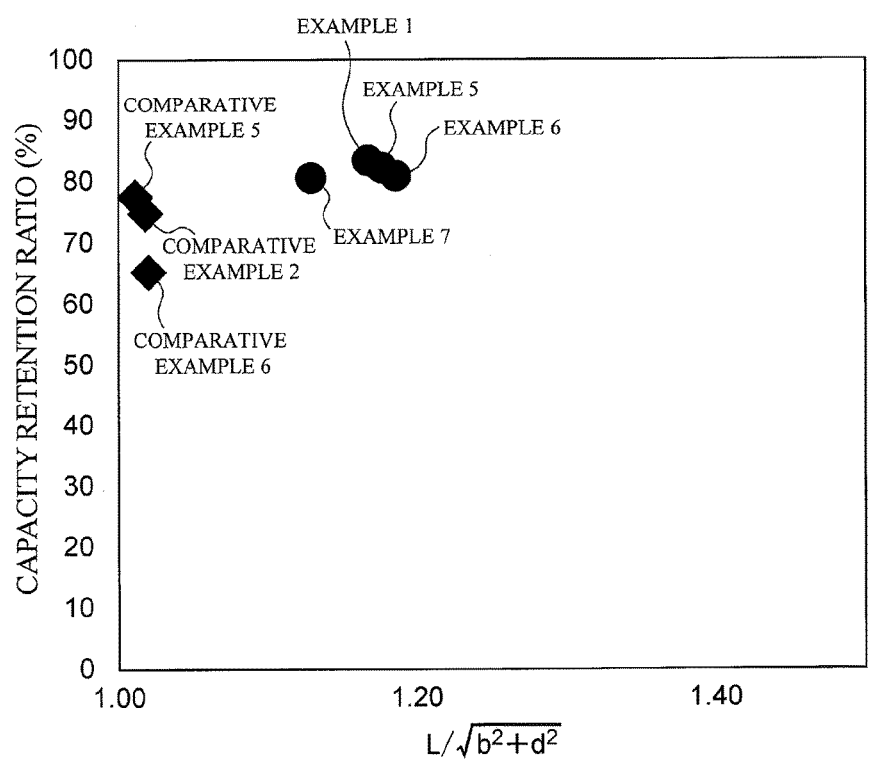

FIGS. 3(a) and 3(b) are a set of cross-sectional views of the secondary battery of FIG. 1 in which FIG. 3(a) illustrates an enlarged extra space in an initial state and FIG. 3(b) illustrates an enlarged extra space after the electrodes expand;

FIG. 4(a) is a plan view of the secondary battery according to one or more embodiments of the present invention and FIG. 4(b) is a cross-sectional view when cutting the secondary battery of (a) at the xz-plane;

FIG. 5 is a cross-sectional view of the secondary battery according to one or more embodiments of the present invention;

FIG. 6(a) is a plan view of a secondary battery according to a modified example of one or more embodiments of the present invention and FIG. 6(b) is a cross-sectional view when cutting the secondary battery of FIG. 6(a) at the xz-plane;

FIG. 7 is a cross-sectional view of the secondary battery according to the modified example of one or more embodiments of the present invention;

FIG. 8(a) is a plan view of a secondary battery according to another modified example of one or more embodiments of the present invention and FIG. 8(b) is a cross-sectional view when cutting the secondary battery of FIG. 8(a) at the xz-plane;

FIG. 9 is a graph illustrating the capacity retention ratio to the parameter (a) in the secondary batteries according to Examples 1 to 4 and Comparative Examples 1 to 4;

FIG. 10 is a graph illustrating the capacity retention ratio to the parameter (a/d) in the secondary batteries according to Examples 1 to 4 and Comparative Examples 1 to 4;

FIG. 11 is a graph illustrating the capacity retention ratio to the parameter (L/d) in the secondary batteries according to Examples 1 to 4 and Comparative Examples 1 to 4;

FIG. 12 is a graph illustrating the capacity retention ratio to the parameter $(L/\sqrt{b^2+d^2})$ in the secondary batteries according to Examples 1 to 4 and Comparative Examples 1 to 4;

FIG. 13 is a graph illustrating the capacity retention ratio to the parameter (d) in the secondary batteries according to Examples 1, 6, and 7 and Comparative Examples 2, 5, and 6;

FIG. 14 is a graph illustrating the capacity retention ratio to the parameter (a/d) in the secondary batteries according to Examples 1 and 5 to 7 and Comparative Examples 2, 5, and 6;

FIG. 15 is a graph illustrating the capacity retention ratio to the parameter (L/d) in the secondary batteries according to Examples 1 and 5 to 7 and Comparative Examples 2, 5, and 6; and FIG. 16 is a graph illustrating the capacity retention ratio to the parameter $(L/\sqrt{(b^2+d^2)})$ in the secondary batteries according to Examples 1 and 5 to 7 and Comparative Examples 2, 5, and 6.

DETAILED DESCRIPTION OF THE EMBODIMENTS

[Mode(s) for Carrying out the Invention]

Hereinafter, one or more embodiments of the present invention will be described with reference to the drawings.

Figure 2:
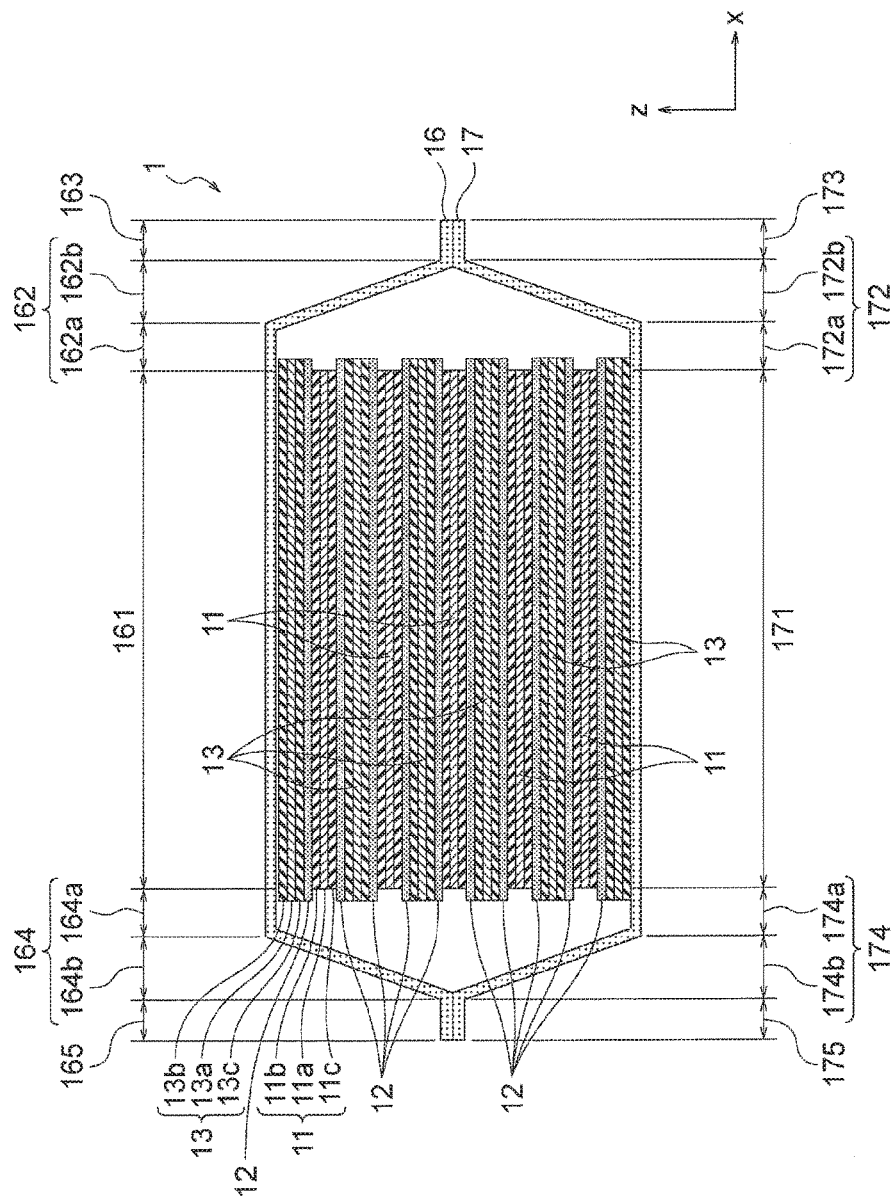
FIG. 2 is a cross-sectional view along line II-II of FIG. 1.

Secondary battery 1 according to one or more embodiments of the present invention is a lithium-based, plate-like, laminate-type flat (thin) battery. The secondary battery 1 is composed of five positive electrode plates 11, ten separators 12, six negative electrode plates 13, a positive electrode terminal 14, a negative electrode terminal 15, an upper exterior member 16, a lower exterior member 17, and an electrolyte which is not particularly illustrated, as illustrated in FIG. 1 and FIG. 2. The numbers of the positive electrode plates 11, separators 12, and negative electrode plates 13 are merely exemplified and other numbers thereof may also be employed.

The positive electrode plates 11, separators 12, and negative electrode plates 13 constitute a power generation element 18. The positive electrode plates 11 and negative electrode plates 13 constitute electrode plates. The upper exterior member 16 and lower exterior member 17 constitute a pair of exterior members.

Each of the positive electrode plates 11 which constitute the power generation element 18 has a positive electrode-side collector 11a that extends to the positive electrode terminal 14 and positive electrode layers 11b and 11c that are formed on both main surfaces of a part of the positive electrode-side collector 11a. The positive electrode layers 11b and 11c may be formed only on areas of each positive electrode plate 11 at which the positive electrode plate 11 substantially overlaps the separators 12 when the positive electrode plates 11, separators 12, and negative electrode plates 13 are laminated to constitute the power generation element 18. In one or more embodiments of the present invention, the positive electrode plate 11 and the positive electrode-side collector 11a are formed of one conductor, but the positive electrode plate 11 and the positive electrode-side collector 11a may be configured as separate components and then bonded with each other.

The positive electrode-side collector 11a of the positive electrode plate 11 is composed of aluminum foil. The positive electrode-side collector 11a may also be composed of electrochemically stable metal foil, such as aluminum alloy foil, copper foil, and nickel foil. The positive electrode layers 11b and 11c of the positive electrode plate 11 contain a lithium-nickel-manganese-cobalt composite oxide (referred also to as an "NMC composite oxide," hereinafter) as the positive electrode active material. The NMC composite oxide has a layered crystal structure in which lithium atom layers and transition metal atom layers (of Mn, Ni, and Co that are orderly arranged) are stacked alternately via oxygen atom layers and one Li atom is included in terms of one atom of transition metal M so as to increase an amount of extractable Li and high capacity. The positive electrode active material may also be a lithium composite oxide, such as lithium nickelate ($LiNiO_2$), lithium manganate ($LiMnO_2$), and lithium cobaltate ($LiCoO_2$). The positive electrode active material may also be a combination of the above lithium composite oxides.

The positive electrode layers 11b and 11c are formed by preparing a positive electrode active material that contains the NMC composite oxide, preparing a mixture of the positive electrode active material, a conductive agent, a binder (adhesive), and a slurry viscosity adjusting solvent, applying the mixture to both main surfaces of the positive electrode-side collector 11a, and drying and flatting the mixture. The conductive agent may be a carbon black such as Ketjen black and acetylene black. The binde may be aqueous dispersion of polyvinylidene fluoride (PVdF) and/or polytetrafluoroethylene (PTFE). The slurry viscosity adjusting solvent is N-methyl-2-pyrrolidone (NMP) or the like.

Each of the negative electrode plates 13 which constitute the power generation element 18 has a negative electrode-side collector 13a that extends to the negative electrode terminal 15 and negative electrode layers 13b and 13c that are formed on both main surfaces of a part of the negative electrode-side collector 13a. Similar to the positive electrode side, the negative electrode layers 13b and 13c of the negative electrode plate 13 may also be formed only on areas of each negative electrode plate 13 at which the negative electrode plate 13 substantially overlaps the separators 12. In one or more embodiments of the present invention, the negative electrode plate 13 and the negative electrode-side collector 13a are formed of one conductor, but the negative electrode plate 13 and the negative electrode-side collector 13a may be configured as separate components and then bonded with each other.

The negative electrode-side collector 13a of the negative electrode plate 13 is composed of copper foil. The negative electrode-side collector 13a may also be composed of electrochemically stable metal foil, such as nickel foil, stainless steel foil, and iron foil. The negative electrode layers 13b and 13c of the negative electrode plate 13 contain synthetic graphite as the negative electrode active material. The negative electrode active material may be material which absorb and release lithium ions, such as Si alloy, mixture of graphite and Si, amorphous carbon, non-graphitizable carbon, graphitizable carbon, and graphite.

The negative electrode layers 13b and 13c are formed by preparing a negative electrode active material that contains synthetic graphite while containing ammonium salt of carboxymethyl cellulose and styrene-butadiene copolymer latex as binders, dispersing the negative electrode active material in purified water to obtain a negative electrode active material slurry, applying the slurry to both main surfaces of the negative electrode-side collector 13a, and drying and flatting the slurry. The negative electrode active material slurry to be used may also be obtained by dispersing PVdF as a binder in NMP.

The separators 12 of the power generation element 18 are to prevent short circuit between the above-described positive electrode plates 11 and negative electrode plates 13, and the separators 12 may have a function of holding an electrolyte. Each separator 12 is a microporous membrane that is composed, for example, of polyolefin such as polyethylene (PE) and polypropylene (PP), and has a function of shutting off an excessive current so that the heat generated by the excessive current blocks the pores.

The separator 12 used in one or more embodiments of the present invention is not limited only to a single-layer membrane. The separator 12 may be formed by a membrane of a three-layer structure in which a polypropylene membrane is sandwiched by polyethylene membranes. The separator 12 may be formed by a membrane configured such that a polyolefin microporous membrane, an organic nonwoven fabric and the like are laminated. The separator 12 may be a separator having a heat-resistant and insulating layer (ceramic layer) at the surface (so-called ceramic separator). Making the separator 12 as a multilayer in such a manner can give various functions, such as a function of preventing an excessive current, a function of holding an electrolyte, and a function of maintaining the shape of the separator (enhancing the stiffness), to the separator.

The above power generation element 18 is configured as a laminate-type power generation element in which the positive electrode plates 11 and the negative electrode plates 13 are laminated alternately via each of the separators 12 (The power generation elements 18 includes pairs of electrodes laminated via a separator 12, each of the pairs of the electrodes having which two or more plate-like electrodes are laminated via each of separators.). The five positive electrode plates 11 are connected to the positive electrode terminal 14 of metal foil via the positive electrode-side collectors 11a while the six negative electrode plates 13 are connected to the negative electrode terminal 15 of metal foil via the negative electrode-side collectors 13a in a similar manner.

The positive electrode terminal 14 and the negative electrode terminal 15 are not particularly limited, provided that they are made of electrochemically stable metal material. Examples of the positive electrode terminal 14 include, as in the above-described positive electrode-side collector 11a, aluminum foil, aluminum alloy foil, copper foil, and nickel foil which have, for example, a thickness of about 0.2 mm. Examples of the negative electrode terminal 15 include, as in the above-described negative electrode-side collector 13a, nickel foil, copper foil, stainless steel foil, and iron foil which have, for example, a thickness of about 0.2 mm.

In one or more embodiments of the present invention, the electrode plates 11 and 13 are configured to be connected to the electrode terminals 14 and 15 such that the metal foil which constitutes each of the collectors 11a and 13a is extended to the electrode terminal 14 or 15. That is, the electrode layer (positive electrode layer 11b or 11c or negative electrode layer 13b or 13c) is formed on a part of one collector 11a or 13a while the remaining end part of the collector foil is used as a connection member with the electrode terminal. As previously described, the metal foil which constitutes each of the collector 11a and 13a and the metal foil which constitutes the connection member may also be connected with each other by using another material or component.

The upper exterior member 16 and the lower exterior member 17 house and seal the power generation element 18 together with an electrolyte. As will be understood, the power generation element may be a part of the laminated electrode plates within which the positive electrodes and the negative electrodes substantially overlap one another via the separators. The upper exterior member 16 and the lower exterior member 17 serve as a pair of members that constitute a case for sealing the power generation element 18 and the electrolyte solution The upper exterior member 16 and the lower exterior member 17 are configured as below.

As illustrated in FIG. 2, the upper exterior member 16 and the lower exterior member 17 are each formed into a cup shape. The upper exterior member 16 has an abutting part 161, an extending part 162, an extending part 164, a sealing part 163 and a sealing part 165. The lower exterior member 17 has an abutting part 171, an extending part 172, an extending part 174, a sealing part 173 and a sealing part 175. The upper exterior member 16 and the lower exterior member 17 are each formed into a rectangular shape when viewed from the lamination direction (z-direction in FIG. 1) of the electrode plates laminated in the power generation element 18.

The abutting part 161 has an abutting surface that abuts against a main surface (surface parallel to the lamination surface of the electrode plates laminated in the power generation element 18: xy-plane in FIG. 1) of the negative electrode plate 13. The abutting surface is parallel to a main surface of the negative electrode plate 13 located at the uppermost layer and has the same shape as that of the main surface. The abutting surface of the abutting part 161 corresponds to the lower surface of a lower-layer member of the abutting part 161 which is a multilayer. When the exterior members 16 and 17 are worked to seal the power generation element 18, the abutting part 161 applies a pressure to the negative electrode plate 13 located at the uppermost layer. On the other hand, when the charge and discharge are repeated and accordingly the power generation element 18 expands in the thickness direction (z-direction in FIG. 2), the abutting part 161 receives a pressure directly from the negative electrode plate 13. The abutting surface of the abutting part 161 is an area that is within the main surface of the exterior member 16 corresponding to the main surface of the negative electrode plate 13 and that receives a pressure from the power generation element 18. The abutting surface receives a pressure as the reaction force from the power generation element 18 in a state in which the exterior members 16 and 17 seal the power generation element 18. The abutting surface otherwise receives a pressure from the power generation element 18 when the power generation element 18 expands due to the use of battery.

The sealing parts 163 and 165 are in close contact with the sealing parts 173 and 175, respectively, of the exterior member 17 while overlapping them. The sealing parts 163 and 165 are located at the outer circumference of the exterior member 16. The sealing parts 163 and 165 are configured to surround the power generation element 18 in a plan view of the exterior member 16 when viewed from the z-direction. The sealing parts 163 and 165 are located outside the abutting part 161 via the extending parts 162 and 164 in a plan view of the exterior member 16 when viewed from the z-direction. The sealing parts 163 and 165 are located at positions between the abutting part 161 and the abutting part 171 with respect to the height in the lamination direction (z-direction) of electrode plates of the power generation element 18. In other words, the sealing parts 163 and 165 are located at lower positions than a position of the abutting part 161 with respect to the height in the lamination direction (z-direction). In the example of FIG. 2, the sealing parts 163 and 165 are located at the middle position between the abutting part 161 and the abutting part 171 with respect to the height in the lamination direction (z-direction).

The sealing parts 163 and 165 illustrated in FIG. 2 are located at both ends of the exterior member 16, which is formed in a rectangular shape, along the long sides. In addition, another pair of sealing parts like the sealing parts 163 and 165 is formed at both end positions of the exterior member 16 along the short sides.

The extending part 162 is a part in which the exterior member 16 extends from the abutting part 161 to the sealing part 163. The extending part 162 is a member for forming a space between the laminate-type power generation element 18 and the sealing parts 163 and 173 (side surfaces of the exterior members 16 and 17).

The extending part 162 has a flat part 162a and an inclined part 162b. The flat part 162a is formed with a surface parallel to the abutting surface of the abutting part 161. The inclined part 162b is formed with a surface inclined with respect to the parallel surface to the flat part 162a. The exterior member 16 extends along the abutting surface of the abutting part 161 thereby to form the flat part 162a and the exterior member 16 is curved at the outer edge of the flat part 162a to extend toward the sealing part 163 thereby to form the inclined part 162b. The flat part 162a functions as a margin when forming the space between the laminate-type power generation element and the sealing parts 163 and 173 (side surfaces of the exterior members 16 and 17). Providing the flat part 162a allows the space to extend in the direction (x-direction or y-direction) along the lamination surface of the electrodes.

The extending part 164 is a part in which the exterior member 16 extends from the abutting part 161 to the sealing part 165. The extending part 164 has a flat part 164a and an inclined part 164b. The extending part 164, flat part 164a, and inclined part 164b are configured in similar manners to those for the above-described extending part 162, flat part 162a, and inclined part 162b, respectively, and the description will therefore be omitted.

The exterior member 17 is a member that seals the power generation element 18 and the electrolyte from the opposite side to the exterior member 16. The exterior member 17 is configured in a similar manner to that for the exterior member 16, and the description will therefore be omitted. As will be understood, the abutting part 171 is configured in a similar manner to that for the abutting part 161, the extending parts 172 and 174 are configured in similar manners to those for the extending parts 162 and 164, and the sealing parts 173 and 175 are configured in similar manners to those for the sealing parts 163 and 165. This allows the exterior members 16 and 17 to be configured in a form of a pair of cups.

Although not particularly illustrated, in one or more embodiments of the present invention, the upper exterior member 16 and the lower exterior member 17 each have a three-layer structure in which an interior layer, an intermediate layer, and an exterior layer are arranged in this order from the inside to the outside of the secondary battery 1. The interior layer is composed of a film of resin, such as polyethylene, modified polyethylene, polypropylene, modified polypropylene, and ionomer, which is excellent in the electrolyte solution resistance and thermal adhesiveness. The intermediate layer is composed, for example, of metal foil such as aluminum foil. The exterior layer is composed of a film of resin, such as polyamide-based resin and polyester-based resin, which is excellent in the electrical insulation.

Thus, the upper exterior member 16 and the lower exterior member 17 are formed of a material having flexibility, such as a resin-metal thin film laminate material. This flexible material is configured, for example, such that one surface (at the side of interior surface of the secondary battery 1) of metal foil such as aluminum foil is laminated with a resin and the other surface (at the side of exterior surface of the secondary battery 1) is laminated with another resin. Examples of the resin used for the one surface include polyethylene, modified polyethylene, polypropylene, modified polypropylene, and ionomer. Examples of the resin used for the other surface include polyamide-based resin and polyester-based resin.

When the exterior members 16 and 17 are each provided with a metal layer in addition to resin layers in the above manner, it is possible to enhance the strength of the exterior member itself. Moreover, when the interior layers of the exterior members 16 and 17 are composed, for example, of a resin such as polyethylene, modified polyethylene, polypropylene, modified polypropylene, and ionomer, it is possible to ensure the excellent thermal adhesiveness with the metallic electrode terminals 14 and 15.

As illustrated in FIG. 1 and FIG. 2, the positive electrode terminal 14 is led out from one end part of the sealed exterior members 16 and 17 while the negative electrode terminal 15 is led out from the other end part. Accordingly, a gap corresponding to the thickness of the electrode terminals 14 and 15 is generated in the thermal adhesion part between the upper exterior member 16 and the lower exterior member 17. In order to maintain the sealing ability in the secondary battery 1, a sealing film composed of an appropriate material such as polyethylene and polypropylene, for example, may be interposed between the electrode terminals 14 and 15 and the exterior members 16 and/or 17. This sealing film may preferably be composed of the same series of resin as the resin that constitutes the exterior members 16 and 17 for both the positive electrode terminal 14 and the negative electrode terminal 15 in view of the thermal adhesiveness.

After the above-described power generation element 18, a part of the positive electrode terminal 14, and a part of the negative electrode terminal 15 are wrapped with the exterior members 16 and 17 and the interior space formed between the exterior members 16 and 17 is suctioned to a vacuum state while being injected with a liquid electrolyte, the outer edges of the exterior members 16 and 17 are hot-pressed for thermal adhesion and sealing. The liquid electrolyte may be obtained by dissolving a solute of lithium salt, such as lithium perchlorate, lithium borofluoride, and lithium hexafluorophosphate, in an organic liquid solvent.

Examples of the organic liquid solvent include ester-based solvent such as propylene carbonate (PC), ethylene carbonate (EC), dimethyl carbonate (DMC), diethyl carbonate (DEC) and ethyl methyl carbonate (EMC), and those in which an additive such as vinylene carbonate (VC), fluoroethylene carbonate (FEC) and propane sultone (PS) is added to the above solvent. The organic liquid solvent in one or more embodiments of the present invention is not limited to the above, and there can also be used an organic liquid solvent in which ether-based solvent such as γ-butyrolactone (γ-BL) and diethoxy ethane (DEE) or other solvent is mixed and blended with an ester-based solvent. The organic liquid solvent may preferably contain various additives, such as vinylene carbonate (VC), fluoroethylene carbonate (FEC), and 1,3-propanesultone (PS).

Next, the volumetric energy density and rated discharge capacity of the secondary battery 1 will be described. In general electric cars, market requirements for the traveling distance (cruisable distance) per charge may be several hundred kilometers. In consideration of such a cruisable distance, the volumetric energy density of the secondary battery 1 may preferably be 157 Wh/L or more, and the rated capacity may preferably be 20 Wh or more.

In the secondary battery 1 according to one or more embodiments of the present invention, the largeness of battery is defined from the relation of battery surface area and battery capacity as an aspect of the large battery different from an aspect of the physical largeness of electrodes. Specifically, the secondary battery 1 is a flat laminate-type battery, in which the value of a ratio of the battery surface area (projected area of the battery including the battery exterior body) to the rated discharge capacity is 5 cm²/Ah or more and the rated discharge capacity is 3 Ah or more. When the battery is made to have such a large surface area and large capacity, the cycle characteristic tends to decrease due to the occurrence of a local overcharge mode in association with the variation of voltage in the electrode surfaces as described above.

The aspect ratio of the lamination surface of the rectangular electrodes is preferably 1 to 3 and more preferably 1 to 2. The aspect ratio of an electrode is defined as a ratio of the length of long side to the length of short side of a rectangular positive electrode active material layer. When the aspect ratio falls within such a range, both the required performance for vehicle and the mounting space can be advantageously satisfied.

Next, with reference to FIGS. 3(*a*) and 3(*b*), the variation of an extra space will be described when the charge and discharge are repeated and accordingly the electrodes of the power generation element 18 expand in the thickness direction. FIGS. 3(*a*) and 3(*b*) are a set of cross-sectional views of the secondary battery in which FIG. 3(*a*) illustrates an enlarged extra space in an initial state and FIG. 3(*b*) illustrates an enlarged extra space after the electrodes expand. The extra space is a space formed between the laminate-type power generation element 18 and the side surfaces (corresponding to the extending parts 162, 164, 172, and 174) of the exterior members 16 and 17.

In the initial state of the secondary battery, the thickness of the power generation element 18 is $d_0$ and the length of the flat part 162*a* is $a_0$. As used herein, the thickness $d_0$ of the power generation element 18 is half the thickness of the entire power generation element 18. The thickness $d_0$ of the power generation element 18 refers to a thickness from the electrode plate located at the height of the sealing parts 163 and 173 in the lamination direction (z-direction) to the electrode located at the uppermost layer. The length of the flat part 162*a* refers to the length of a flat portion in the direction (x-direction) along the plane which is a surface parallel to the abutting surface of the abutting part 161.

When charge and discharge of the secondary battery 1 are repeated, the power generation element 18 expands in the z-direction, so that the thickness of the power generation element 18 varies from $d_0$ to $d_1$ ($>d_0$). On the other hand, the width in the x-direction of the power generation element 18 decreases in accordance with the expansion in the z-direction. That is, the power generation element 18 contracts in the x-direction while expanding in the z-direction.

The extending part 162 of the exterior member 16 deforms in accordance with the expansion in the z-direction of the power generation element 18. During this deformation, the flat part 162*a* is drawn due to the expansion in the z-direction of the power generation element 18, and the length of the flat part 162*a* decreases from $a_0$ to $a_1$ ($<a_0$).

When, unlike in one or more embodiments of the present invention, a part corresponding to the flat part 162*a* is not formed and the abutting part 161 and the sealing part 163 are connected to each other via the inclined part 162*b* (this situation is represented by broken lines in FIGS. 3(*a*), 3(*b*)), the stress applied to the exterior member 16 due to the expansion in the z-direction of the power generation element 18 is not relaxed. Therefore, the exterior member 16 receives a local stress at a part abutting against the power generation element 18, at the sealing part 163 and the like. Such a stress does not allow the power generation element 18 to be applied with a uniform pressure as the reaction force against the stress. This may lead to ununiform cell reaction and poor durability of the cell. Moreover, deterioration of the battery may readily progress.

In contrast, in the secondary battery 1 according to one or more embodiments of the present invention, the exterior member 16 is formed with the flat part 162*a* so as to extend the extra space. This can relax the stress applied to a part abutting against the power generation element 18, to the sealing part 163 and the like when the power generation element 18 expands. Therefore, even when the exterior member 16 deforms, the pressure applied to the power generation element 18 is suppressed from being ununiform, the cell reaction can be uniform, and the durability of the cell is improved.

As the above, a larger volume of the extra space may be advantageous in order to relax the stress when the power generation element expands. If the extra space is excessively large, however, the electrolyte solution is likely to stay in the extra space to impair the uniformity of electrolyte solution in the secondary battery 1 (liquid shortage). Therefore, an upper limit of the volume of extra space may have to be set to increase the space efficiency.

As illustrated in FIGS. 4(*a*) and 4(*b*), in the secondary battery 1 according to one or more embodiments of the present invention, the relationship among the length (L) of the extending part 162, the length (b) from the electrode plates to the sealing part 163 (173), and the thickness (d) of the power generation element 18 is defined to satisfy Expression (2) below. Satisfying Expression (2) is to prevent the capacity drop due to liquid shortage and the like while improving the durability of the cell.

[Expression 2]

$$1.03 \leq \frac{L}{\sqrt{b^2 + d^2}} \leq 1.22 \qquad (2)$$

FIGS. 4(*a*) and 4(*b*) are a set of views for explaining the lengths a, b, and L and the thickness d included in the above Expression (2) and Expressions (3) and (4) below. FIG. 4(*a*) is a plan view of the secondary battery 1 and FIG. 4(*b*) is a cross-sectional view when cutting the secondary battery 1 at the xz-plane.

As illustrated in FIGS. 4(*a*) and 4(*b*), in the cross section when cutting the secondary battery 1 at the xz-plane (plane parallel to the long side of the rectangular exterior member 16 and along the lamination direction of the electrode plates), b represents a length from the electrode plate (positive electrode plate 11 in FIG. 2) located between the sealing parts 163 and 173 and the sealing parts 165 and 175 to the sealing parts 163 and 173. Otherwise, b represents a length from that electrode plate to the sealing parts 165 and 175. L represents the length of the extending part 162, which is the total length of the length of the flat part 162*a* and the length of the inclined part 162*b*.

In the cross section when cutting the secondary battery 1 at the yz-plane (plane parallel to the short side of the rectangular exterior member 16 and along the lamination direction of the electrode plates), b represents a length from the electrode plate (negative electrode plate 13 in FIG. 2) located at a position corresponding to a position between a pair of the sealing parts to one sealing part of the pair of the sealing parts. L represents the length of the extending part.

Parameter d represents the thickness of the power generation element 18, which refers to a thickness from the specified electrode plate to the electrode plate located at the uppermost layer or a thickness from the specified electrode plate to the electrode plate located at the lowermost layer. The specified electrode plate is located at the height of the sealing parts 163 and 173 in the lamination direction (z-direction).

The relationship between L and d may preferably be defined to satisfy Expression (3) below.

[Expression 3]

$$1.65 \leq \frac{L}{d} \leq 1.95 \quad (3)$$

The relationship between a and d may preferably be defined to satisfy Expression (4) below.

[Expression 4]

$$0.2 \leq \frac{a}{d} < 0.9 \quad (4)$$

In the cross section when cutting the secondary battery 1 at the xz-plane, a represents the length of the flat parts 162a, 164a, 172a, and 174a. In the cross section when cutting the secondary battery 1 at the yz-plane, a represents the length of the flat parts which extend from the long sides of the abutting parts 161 and 171 to the corresponding sealing parts.

FIG. 5 is a cross-sectional view of the secondary battery 1. FIG. 5 is a view for explaining the initial battery state and the battery state after the battery is used a certain number of times. In FIG. 5, the secondary battery 1 indicated by broken lines represents the battery of the initial state while the secondary battery 1 indicated by solid lines represents the battery after use. In FIG. 5, d represents the thickness of the power generation element 18 in the initial state and a represents the length of the flat part 162a in the initial state. In FIG. 5, Δd represents the increase in the thickness of the power generation element 18 when the battery expands and Δa represents the decrease in the length of the extending part 162 when the battery expands. That is, in the secondary battery after the battery is used a certain number of times, the thickness of the power generation element 18 is d+Δd and the length of the flat part 162a is a−Δa.

The certain number of times refers to a number of times of charging and discharging the battery, and the certain number of times is preliminarily defined in accordance with the utilization form and the like of the battery. The certain number of time is preliminarily defined, for example, in accordance with the expected lifetime of a secondary battery.

In order that, after the secondary battery 1 is used the certain number of times, the fully-charged capacitance of the secondary battery 1 maintains a lower limited capacitance or more in consideration of the utilization form of the battery, the parameters may preferably be defined to satisfy Expression (5) or Expression (6) below.

[Expression 5]

$$1.0 \leq \frac{d + \Delta d}{d} \leq 1.4 \quad (5)$$

[Expression 6]

$$0 < \frac{a - \Delta a}{a} \leq 1.0 \quad (6)$$

That is, the shape of the exterior members 16 and 17 may be configured such that the length of the flat part 162a decreases as the thickness d of the power generation element increases due to the use of the secondary battery 1. This allows the secondary battery 1 to have a defined margin of the extra volume with respect to the thickness of the power generation element 18 which expands after the use of a certain number of times. Therefore, when the power generation element 18 expands, the stress applied to a part abutting against the power generation element 18, the stress applied to the sealing part 163 and the like can be relaxed. Moreover, one or more embodiments of the present invention can prevent the capacity drop due to liquid shortage and the like because the efficiency of the extra space can be enhanced.

When the power generation element 18 expands, the flat parts 162a, 164a, 172a, and 174a may be inclined to the abutting surfaces of the abutting parts 161 and 171 (or lamination surface of electrodes) rather than being parallel to the abutting surfaces (see FIG. 3). In this case, a−Δa corresponds to the length of the x-direction component of a length, in the xy-plane (cross section), from the abutting parts 161 and 171 (ends of the abutting parts 161 and 171) to the curved points (corresponding to the point P of FIG. 5). As the thickness d of the power generation element increases due to the use of the secondary battery 1, the length from the abutting parts 161 and 172 to the curved points decreases.

The definitions of shape of the secondary battery 1 represented by Expressions (2) to (4) are applicable not only to the secondary battery 1 as illustrated in FIG. 1 and FIG. 2 but also to secondary batteries 1 according to Modified Example 1 and Modified Example 2 below.

FIGS. 6(a) and 6(b) are a set of views for explaining the lengths a, b, and L and the thickness d included in the above Expression (2) to Expression (6). FIG. 6(a) is a plan view of a secondary battery 1 according to Modified Example 1 and FIG. 6(b) is a cross-sectional view when cutting the secondary battery 1 according to Modified Example 1 at the xz-plane.

As illustrated in FIGS. 6(a) and 6(b), an exterior member 17 is formed as a plate and the main surface of the exterior member 17 is parallel to the lamination surface of electrode plates of a power generation element 18. In the main surface (xy-plane) of the exterior member 17, the interior side of the main surface abuts against the lowermost electrode plate of electrode plates that constitute the power generation element 18. The outer circumference of the main surface is formed with sealing parts 173 and 175 that overlap sealing parts 163 and 165 of an exterior member 16. The sealing parts 173 and 175 are in close contact with the sealing parts 163 and 165, respectively.

The length (L) of the extending parts 162 and 164 and the thickness of the power generation element 18 are the same as those of the secondary battery 1 illustrated in FIG. 4. The length (b) represents a length from the lowermost electrode plate located between the sealing parts 163 and 173 and the sealing parts 165 and 175 to the sealing parts 163, 165, 173, and 175. In Modified Example 1, the electrode plate located between the sealing parts 163 and 173 and the sealing parts 165 and 175 is the electrode plate of the lowermost layer (negative electrode plate in FIG. 5) of the power generation element 18.

The definitions of the secondary battery 1 represented by Expressions (5) and (6) are applicable to the secondary battery 1 according to Modified Example 1. FIG. 7 is a cross-sectional view of the secondary battery 1 according to Modified Example 1. FIG. 7 is a view for explaining the initial battery state and the battery state after the battery is used a certain number of times. In FIG. 7, the secondary battery 1 indicated by broken lines represents the battery of the initial state while the secondary battery 1 indicated by solid lines represents the battery after use.

The parameters a, Δa, d, and Δd according to Modified Example 1 are the same as the above parameters a, Δa, d, and Δd as described using FIG. 5, and the description will therefore be omitted.

FIGS. 8(a) and 8(b) are a set of views for explaining the lengths a, b, and L and the thickness d included in the above Expressions (2) to (4). FIG. 8(a) is a plan view of a secondary battery 1 according to Modified Example 2 and FIG. 8(b) is a cross-sectional view when cutting the secondary battery 1 according to Modified Example 2 at the xz-plane.

As illustrated in FIGS. 8(a) and 8(b), an upper exterior member 16 has an abutting part 161, an extending part 162, an extending part 164, a sealing part 163, and a sealing part 165. A lower exterior member 17 has an abutting part 171, an extending part 172, an extending part 174, a sealing part 173, and a sealing part 175. The abutting parts 161 and 171 are similar to the abutting parts 161 and 171 according to one or more embodiments of the present invention, the sealing parts 163, 165, 173, and 175 are similar to the sealing parts 163, 165, 173, and 175 according to one or more embodiments of the present invention, and the description of the structures will therefore be omitted.

The extending part 162 has a flat part 162a and a curved part 162c. The flat part 162a is similar to the flat part 162a according to one or more embodiments of the present invention. The curved part 162c is curved from the outer edge of the flat part 162a and extends to the sealing part 163. In the cross section when cutting the secondary battery 1 at the xz-plane, the curved part 162c is formed to be a curve so as to expand from the inside of the secondary battery 1 to the outside, as illustrated in FIG. 8(b).

The extending part 164 has a flat part 164a and a curved part 164c. The structures of the flat part 164a and curved part 164c are similar to those of the flat part 162a and curved part 162c, and the description will therefore be omitted.

Similar to the exterior member 16, the exterior member 17 has a shape in which parts of the extending parts 172 and 174 are curved, and seals the power generation element 18 from the opposite side to the exterior member 16. The abutting part 171, flat parts 172a and 174a, curved parts 172c and 174c, and sealing parts 173 and 175, which constitute the exterior member 17, are similar to the abutting part 161, flat parts 162a and 164a, curved parts 162c and 164c, and sealing parts 163 and 165, which constitute the exterior member 16, and the description will therefore be omitted.

The length (L) of the extending parts 162 and 164 is the total length of the length of the flat parts 162a and 164a and the length of the curved parts 162c and 164c. The length (L) of the extending parts 172 and 174 is the total length of the length of the flat parts 172a and 174a and the length of the curved parts 172c and 174c. The thickness of the power generation element 18 and the length (a) are the same as those of the secondary battery 1 illustrated in FIG. 4 according to one or more embodiments of the present invention.

Hereinafter, the present invention will be more specifically described with reference to examples and comparative examples.

<Positive Electrode>

A positive electrode active material slurry was prepared by mixing 90 wt % of an NMC composite oxide ($LiNi_{0.5}Mn_{0.3}Co_{0.2}O_2$) (average particle diameter: 10 μm), 5 wt % of Ketjen black as a conductive agent, 5 wt % of polyvinylidene fluoride (PVdF) as a binder, and an appropriate amount of NMP as a slurry viscosity adjusting solvent. The obtained positive electrode active material slurry was applied to aluminum foil (thickness of 20 μm) as a collector, dried at 120° C., and then formed by compression using a roll press machine to produce each positive electrode plate 11 with a positive electrode active material layer of 18 mg/cm². Another positive electrode active material layer was also formed on the rear surface in the same manner, and the positive electrode plate 11 formed with the positive electrode active material layers on both surfaces of the positive electrode collector was thus produced. With regard to the size of the main surface of the positive electrode plate 11, the length was 215 mm and the width was 190 mm.

<Negative Electrode>

A negative electrode active material slurry was prepared by dispersing 96.5 wt % of synthetic graphite as a negative electrode active material and 1.5 wt % of ammonium salt of carboxymethyl cellulose and 2.0 wt % of styrene-butadiene copolymer latex as binders in purified water. This negative electrode active material slurry was applied to copper foil (thickness of 10 μm) as a negative electrode collector, dried at 120° C., and then formed by compression using a roll press machine to produce each negative electrode plate 13 with a negative electrode active material layer of 10 mg/cm². Another negative electrode active material layer was also formed on the rear surface in the same manner, and the negative electrode plate 13 formed with the negative electrode active material layers on both surfaces of the negative electrode collector was thus produced. With regard to the size of the main surface of the negative electrode plate 13, the length was 219 mm and the width was 194 mm.

<Production of Cell (Secondary Battery 1)>

The positive electrodes produced in the above and the negative electrodes produced in the above were alternately laminated (20 layers of positive electrodes and 21 layers of negative electrodes) via separators to produce a power generation element 18. With regard to the size of the separators, the length was 223 mm and the width was 198 mm.

The obtained power generation element 18 was placed in an aluminum laminate sheet bag and an electrolyte solution was injected therein. The electrolyte solution used was prepared by dissolving 1.0 M of LiPF6 in a mixed solvent of ethylene carbonate (EC), diethyl carbonate (DEC), and ethyl methyl carbonate (EMC) (volume ratio of 1:1:1). The opening part of the aluminum laminate sheet bag was sealed under a vacuum condition so that tabs for current collection connected with both sets of electrodes would be led out, and a laminate-type lithium ion secondary battery was thereby completed.

With regard to the size of the exterior member 16, the outer length in the x-direction ($x_4$ in FIG. 4) was 250 mm, the outer length in the y-direction ($y_4$ in FIG. 4) was 210 mm, and the height in the z-direction was 4 mm. With regard to the size of interior space of the secondary battery 1 for sealing the power generation element 18, the length in the x-direction ($x_3$ in FIG. 4) was 225 mm and the length in the y-direction ($y_3$ in FIG. 4) was 200 mm. The size of interior space corresponds to the size of a portion of the exterior member 16 except the sealing part. With regard to the size of a portion of the exterior member 16 formed by the abutting part 161 and the flat parts 162a and 164a (referred also to as an "upper surface portion of the exterior member 16," hereinafter), the length in the x-direction ($x_2$ in FIG. 4) was 221 mm and the length in the y-direction ($y_2$ in FIG. 4) was 196 mm. The size of the exterior member 17 was the same as the size of the exterior member 16.

With regard to the size of the laminate-type power generation element 18, the length in the x-direction ($x_1$ in FIG. 4) was 215 mm, the length in the y-direction ($y_1$ in FIG. 4) was 190 mm, and the length in the z-direction (length twice d of FIG. 4) was 8 mm.

The length in the x-direction of the secondary battery 1 including the electrode terminals 14 and 15 was 280 mm, the length in the y-direction (width) was 210 mm, and the length in the z-direction (thickness) was 8 mm.

<Durability Test/Confirmation of Initial Performance>

After 0.2 C_CCCV charge (upper limit voltage of 4.15 V, 8 hours) was performed for the complete secondary battery 1 in a constant temperature bath set at 25° C., 0.2 C_CC discharge (lower limit voltage of 2.5 V cut) was performed and the initial charge and discharge capacity was confirmed. In addition, measurement of the volume (Archimedes' method) and measurement of the thickness were carried out.

<Durability Test>

For the complete secondary battery 1, 1 C_CCCV charge (upper limit voltage of 4.15 V, 2 hours) and 1 C_CC discharge (lower limit voltage of 2.5 V cut) were performed 1,000 cycles in a constant temperature bath set at 45° C. After the charge and discharge were performed 1,000 cycles, the charge and discharge capacity of the secondary battery 1 was confirmed and the secondary battery 1 was evaluated by calculating the capacity retention ratio to the initial charge and discharge capacity ((charge and discharge capacity after charge and discharge were performed 1,000 cycles)/ (initial charge and discharge capacity)×100%).

Example 1

Example 1 is the secondary battery 1 produced as the above.

Example 2

With regard to the size of the upper surface portion of the exterior member 16 in the secondary battery 1 according to Example 2, the length in the x-direction ($x_2$ in FIG. 4) was 219 mm and the length in the y-direction ($y_2$ in FIG. 4) was 194 mm. Other sizes and the number of layers of the electrodes are the same as those in Example 1.

Example 3

With regard to the size of the upper surface portion of the exterior member 16 in the secondary battery 1 according to Example 3, the length in the x-direction ($x_2$ in FIG. 4) was 217 mm and the length in the y-direction ($y_2$ in FIG. 4) was 192 mm. Other sizes and the number of layers of the electrodes are the same as those in Example 1.

Example 4

With regard to the size of the upper surface portion of the exterior member 16 in the secondary battery 1 according to Example 4, the length in the x-direction ($x_2$ in FIG. 4) was 222 mm and the length in the y-direction ($y_2$ in FIG. 4) was 197 mm. Other sizes and the number of layers of the electrodes are the same as those in Example 1.

Example 5

In the secondary battery 1 according to Example 5, 22 layers of positive electrodes and 24 layers of negative electrodes were used as the electrode plates. With regard to the size of the exterior member 16, the outer length in the x-direction ($x_4$ in FIG. 4) was 250 mm, the outer length in the y-direction ($y_4$ in FIG. 4) was 210 mm, and the height in the z-direction was 4.5 mm. With regard to the size of the upper surface portion of the exterior member 16, the length in the x-direction ($x_2$ in FIG. 4) was 221 mm and the length in the y-direction ($y_2$ in FIG. 4) was 196 mm. Other sizes are the same as those in Example 1.

Example 6

In the secondary battery 1 according to Example 6, 24 layers of positive electrodes and 25 layers of negative electrodes were used as the electrode plates. With regard to the size of the exterior member 16, the outer length in the x-direction ($x_4$ in FIG. 4) was 250 mm, the outer length in the y-direction ($y_4$ in FIG. 4) was 210 mm, and the height in the z-direction was 5 mm. With regard to the size of the upper surface portion of the exterior member 16, the length in the x-direction ($x_2$ in FIG. 4) was 221 mm and the length in the y-direction ($y_2$ in FIG. 4) was 196 mm. Other sizes are the same as those in Example 1.

Example 7

In the secondary battery 1 according to Example 7, 16 layers of positive electrodes and 17 layers of negative electrodes were used as the electrode plates. With regard to the size of the exterior member 16, the outer length in the x-direction ($x_4$ in FIG. 4) was 250 mm, the outer length in the y-direction ($y_4$ in FIG. 4) was 210 mm, and the height in the z-direction was 3.0 mm. With regard to the size of the upper surface portion of the exterior member 16, the length in the x-direction ($x_2$ in FIG. 4) was 221 mm and the length in the y-direction ($y_2$ in FIG. 4) was 196 mm. Other sizes are the same as those in Example 1.

Comparative Example 1

With regard to the size of the upper surface portion of the exterior member 16 in the secondary battery 1 according to Comparative Example 1, the length in the x-direction ($x_2$ in FIG. 4) was 215 mm and the length in the y-direction ($y_2$ in FIG. 4) was 190 mm. Other sizes and the number of layers of the electrodes are the same as those in Example 1.

Comparative Example 2

With regard to the size of the upper surface portion of the exterior member 16 in the secondary battery 1 according to Comparative Example 2, the length in the x-direction ($x_2$ in FIG. 4) was 216 mm and the length in the y-direction ($y_2$ in FIG. 4) was 191 mm. Other sizes and the number of layers of the electrodes are the same as those in Example 1.

Comparative Example 3

With regard to the size of the upper surface portion of the exterior member 16 in the secondary battery 1 according to Comparative Example 3, the length in the x-direction ($x_2$ in FIG. 4) was 223 mm and the length in the y-direction ($y_2$ in FIG. 4) was 198 mm. Other sizes and the number of layers of the electrodes are the same as those in Example 1.

Comparative Example 4

With regard to the size of the upper surface portion of the exterior member 16 in the secondary battery 1 according to Comparative Example 4, the length in the x-direction ($x_2$ in FIG. 4) was 225 mm and the length in the y-direction ($y_2$ in FIG. 4) was 200 mm. Other sizes and the number of layers of the electrodes are the same as those in Example 1.

Comparative Example 5

In the secondary battery 1 according to Comparative Example 5, 16 layers of positive electrodes and 17 layers of negative electrodes were used as the electrode plates. With regard to the size of the exterior member 16, the outer length in the x-direction ($x_4$ in FIG. 4) was 250 mm, the outer length in the y-direction ($y_4$ in FIG. 4) was 210 mm, and the height in the z-direction was 3.0 mm. With regard to the size of the upper surface portion of the exterior member 16, the length in the x-direction ($x_2$ in FIG. 4) was 216 mm and the length in the y-direction ($y_2$ in FIG. 4) was 191 mm. Other sizes are the same as those in Example 1.

Comparative Example 6

In the secondary battery 1 according to Comparative Example 6, 28 layers of positive electrodes and 29 layers of negative electrodes were used as the electrode plates. With regard to the size of the exterior member 16, the outer length in the x-direction ($x_4$ in FIG. 4) was 250 mm, the outer length in the y-direction ($y_4$ in FIG. 4) was 210 mm, and the height in the z-direction was 5.0 mm. With regard to the size of the upper surface portion of the exterior member 16, the length in the x-direction ($x_2$ in FIG. 4) was 216 mm and the length in the y-direction ($y_2$ in FIG. 4) was 191 mm. Other sizes are the same as those in Example 1.

Evaluation results for Examples 1 to 7 and Comparative Examples 1 to 6 are listed in Table 1 and Table 2.

TABLE 1

| | a | b | d | Cell thickness (total) | L | $L/\sqrt{b^2 + d^2}$ | a/d | b/d | L/d | Capacity retention ratio |
|---|---|---|---|---|---|---|---|---|---|---|
| Example 1 | 3.0 | 5.0 | 4.0 | 8.0 | 7.47 | 1.17 | 0.75 | 1.25 | 1.87 | 83.5 |
| Example 2 | 2.0 | 5.0 | 4.0 | 8.0 | 7.00 | 1.09 | 0.50 | 1.25 | 1.75 | 82.5 |
| Example 3 | 1.0 | 5.0 | 4.0 | 8.0 | 6.66 | 1.04 | 0.25 | 1.25 | 1.66 | 80.3 |
| Example 4 | 3.5 | 5.0 | 4.0 | 8.0 | 7.77 | 1.21 | 0.88 | 1.25 | 1.94 | 81.0 |
| Comparative Example 1 | 0.0 | 5.0 | 4.0 | 8.0 | 6.40 | 1.00 | 0.00 | 1.25 | 1.60 | 62.5 |
| Comparative Example 2 | 0.5 | 5.0 | 4.0 | 8.0 | 6.52 | 1.02 | 0.13 | 1.25 | 1.63 | 74.5 |
| Comparative Example 3 | 4.0 | 5.0 | 4.0 | 8.0 | 8.12 | 1.27 | 1.00 | 1.25 | 2.03 | 78.3 |
| Comparative Example 4 | 5.0 | 5.0 | 4.0 | 8.0 | 9.00 | 1.41 | 1.25 | 1.25 | 2.25 | 75.1 |

TABLE 2

| | a | b | d | Cell thickness | L | $L/\sqrt{b^2 + d^2}$ | a/d | b/d | L/d | Capacity retention ratio |
|---|---|---|---|---|---|---|---|---|---|---|
| Example 1 | 3.0 | 5.0 | 4.0 | 8.0 | 7.47 | 1.17 | 0.75 | 1.25 | 1.87 | 83.5 |
| Example 5 | 3.0 | 5.0 | 4.5 | 9.0 | 7.92 | 1.18 | 0.67 | 1.11 | 1.76 | 82.0 |
| Example 6 | 3.0 | 5.0 | 5.0 | 10.0 | 8.39 | 1.19 | 0.60 | 1.00 | 1.68 | 81.0 |
| Example 7 | 3.0 | 5.0 | 3.0 | 6.0 | 6.60 | 1.1 | 1.00 | 1.67 | 2.20 | 80.5 |
| Comparative Example 5 | 0.5 | 5.0 | 3.0 | 6.0 | 5.91 | 1.0 | 0.17 | 1.67 | 1.97 | 77.0 |
| Comparative Example 2 | 0.5 | 5.0 | 4.0 | 8.0 | 6.52 | 1.0 | 0.13 | 1.25 | 1.63 | 74.5 |
| Comparative example 6 | 0.5 | 5.0 | 5.0 | 10.0 | 7.23 | 1.0 | 0.10 | 1.00 | 1.45 | 65 |

FIGS. 9 to 16 are graphs representing the relationships of the capacity retention ratio to the parameters (a, a/d, L/d, $L/\sqrt{b^2+d^2}$, and d). FIG. 9 is a graph representing the relationship of the capacity retention ratio to the parameter (a), FIG. 13 is a graph representing the relationship of the capacity retention ratio to the parameter (d), FIGS. 10 and 14 are graphs each representing the relationship of the capacity retention ratio to the parameter (a/d), FIGS. 11 and 15 are graphs each representing the relationship of the capacity retention ratio to the parameter (L/d), and FIGS. 12 and 16 are graphs each representing the relationship of the capacity retention ratio to the parameter ($L/\sqrt{b^2+d^2}$).

As listed in Table 1 and illustrated in the graphs of FIG. 9 to FIG. 12, according to the secondary batteries 1 (Examples 1 to 4) in which the parameters b, d. and L are defined to satisfy Expression (2), a high capacity retention ratio (capacity retention ratio of 80% or more) can be obtained even after the use of 1,000 cycles. Moreover, according to the secondary batteries 1 in which the parameters L and d are defined to satisfy Expression (3), a high capacity retention ratio (capacity retention ratio of 80% or more) can be obtained after the use of 1,000 cycles. Furthermore, according to the secondary batteries 1 in which the parameters a and d are defined to satisfy Expression (4), a high capacity retention ratio (capacity retention ratio of 80% or more) can be obtained after the use of 1,000 cycles.

As listed in Table 2 and illustrated in the graphs of FIG. 13 to FIG. 16, comparing the secondary batteries in which the parameter d is the same (d=3 in Comparative Example 5 and Example 7, d=4 in Comparative Example 2 and Example 1, and d=5 in Comparative Example 6 and Example 6), a larger effect is obtained as the value of d increases. According to the secondary batteries 1 (Examples 1 and 5 to 7) in which the parameters b, d. and L are defined to satisfy Expression (2), a high capacity retention ratio (capacity retention ratio of 80% or more) can be obtained after the use of 1,000 cycles. Moreover, according to the secondary batteries 1 in which the parameters L and d are defined to satisfy Expression (3), a high capacity retention ratio (capacity retention ratio of 80% or more) can be obtained after the use of 1,000 cycles. Furthermore, according to the secondary batteries 1 in which the parameters a and d are defined to satisfy Expression (4), a high capacity retention ratio (capacity retention ratio of 80% or more) can be obtained after the use of 1,000 cycles. The parameters of Example 7 fall outside Expression (3) and Expression (4), but satisfy Expression (2) thereby to allow a high capacity retention ratio (capacity retention ratio of 80% or more) to be obtained.

In contrast, the secondary batteries 1 (Comparative Examples 1 to 6) in which the parameters b, d, and L do not satisfy Expression (2) exhibit results of a poor capacity retention ratio after the use of 1,000 cycles. Similarly, the secondary batteries 1 (Comparative Examples 1 to 6) in which the parameters L, a, and d do not satisfy Expression (3) or Expression (4) exhibit results of a poor capacity retention ratio after the use of 1,000 cycles.

The above flat parts 162a, 164a, 172a, and 174a correspond to the "first extending part" of the present invention, and the inclined parts 162b, 164b, 172b, and 174b correspond to the "second extending part" of the present invention.

DESCRIPTION OF REFERENCE NUMERALS

1 Secondary battery
11 Positive electrode plate
12 Separator
13 Negative electrode plate
16, 17 Exterior member
161, 171 Abutting part
162, 164, 172, 174 Extending part
163, 175 Sealing part

The invention claimed is:

1. A flat lithium ion secondary battery comprising:
a laminate-type power generation element in which two or more plate-like positive electrode plates and negative electrode plates are laminated via each of separators; and
a pair of rectangular exterior members when viewed from a lamination direction of the two or more positive electrode plates and negative electrode plates, the rectangular exterior members sealing the laminate-type power generation element and an electrolyte solution, wherein
at least one exterior member of the pair of the rectangular exterior members comprises:
an abutting part including an abutting surface that abuts against an uppermost layer electrode of the two or more positive electrode plats and negative electrode plates;
a sealing part at which the rectangular exterior members overlap each other at an outer circumferential position of the rectangular exterior members; and
an extending part that extends from the abutting part to the sealing part,
the positive electrode plate includes an NMC composite oxide and polyvinylidene fluoride,
the negative electrode plate includes a mixture of graphite and polyvinylidene fluoride or a mixture of graphite and styrene-butadiene copolymer latex,
the electrolyte solution includes ester-based solvent of propylene carbonate, ethylene carbonate, dimethyl carbonate, diethyl carbonate or ethyl methyl carbonate as an organic liquid solvent,
the flat lithium ion secondary battery satisfies $$1.04 \le \frac{L}{\sqrt{b^2 + d^2}} \le 1.21$$

and $1.66 \le L/d \le 1.94$, a value of a ratio of a battery surface area to a rated capacity of the flat lithium ion secondary battery is 5 cm2/Ah or more, the rated capacity is 3 Ah or more, and the battery surface area is a projected area of the flat lithium ion secondary battery including a battery exterior body,
a capacity retention ratio is 80% or more and the capacity retention ratio is a capacity retention ratio to initial capacity retention ratio of the flat lithium ion secondary battery when used 1000 cycles, and
an aspect ratio of the electrode plates is 1 to 3 and the aspect ratio is defined as a ratio of a length of the long sides to a length of the short sides of a lamination surface of the two or more positive electrode plates and negative electrode plates,
wherein, in a cross section of the flat secondary battery when cutting through the flat secondary battery by a plane parallel to sides that form the rectangular exterior members and along the lamination direction,
the L represents a length of the extending part,
the b represents a length from an inter-sealing part electrode of the two or more positive electrode plates and negative electrode plates to the sealing parts, the inter-sealing part electrode is located at height of the sealing part in the lamination direction, and
the d represents a thickness of the laminate-type power generation element from the inter-sealing part electrode to the uppermost layer electrode.

2. The flat lithium ion secondary battery according to claim 1,
wherein the extending part includes a parallel plane that is in the same plane with the abutting surface, and the flat secondary battery satisfies $0.25 \le a/d \le 0.88$ wherein, in the cross section, the a represents a length of the parallel plane in a direction perpendicular to the lamination direction.

3. The flat lithium ion secondary battery according to claim 1,
wherein the extending part includes a first extending part that extends from an end part of the abutting part and a second extending part that is inclined to the abutting surface between the first extending part and the sealing part, and a length of the first extending part in the cross section decreases as the d increases due to use of the flat secondary battery.

* * * * *